June 10, 1924.
J. O. ARKLEY
1,497,257
DRAWBAR HARROW LIFT
Filed June 7, 1923     2 Sheets-Sheet 1
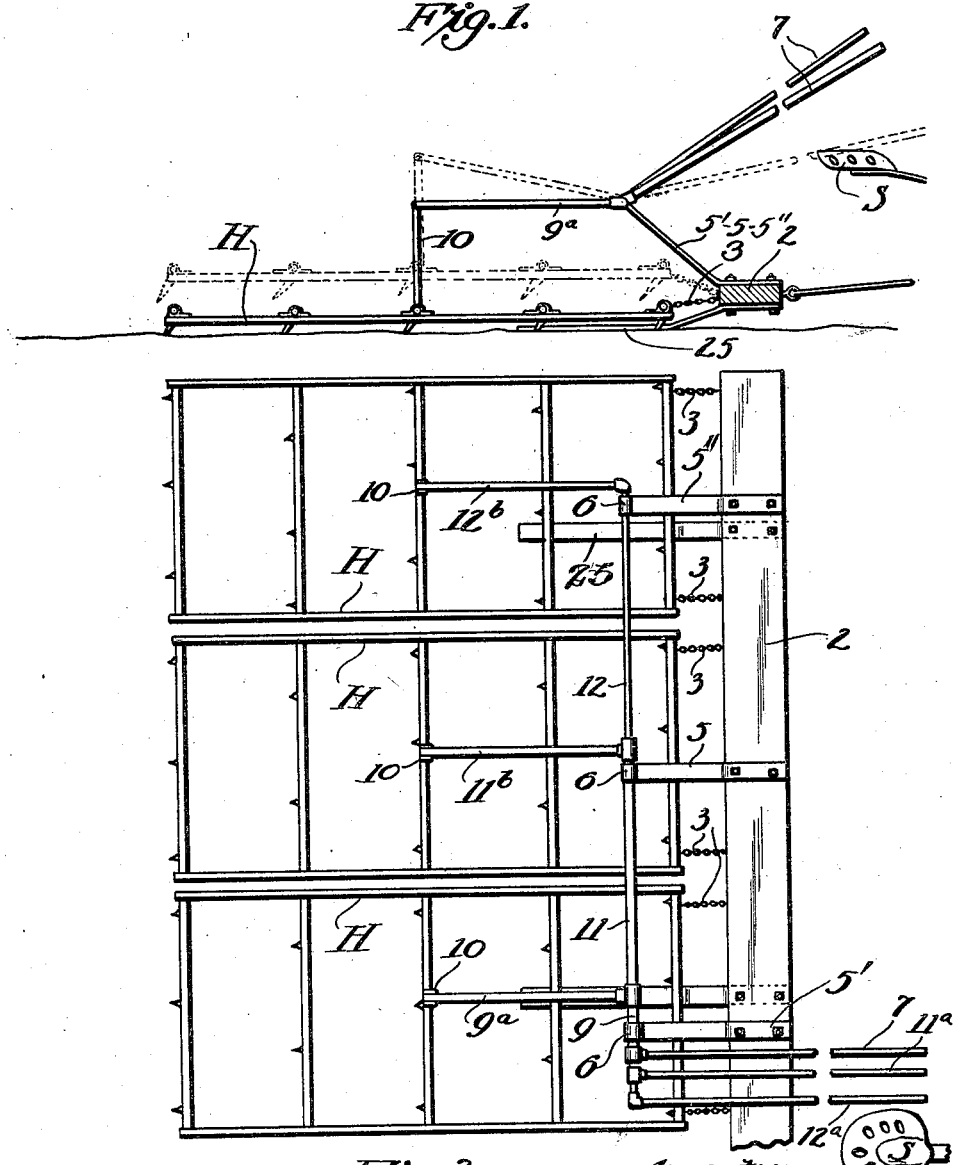

June 10, 1924.

J. O. ARKLEY 1,497,257

DRAWBAR HARROW LIFT

Filed June 7, 1923   2 Sheets-Sheet 2

Inventor
J. O. Arkley
by Hazard and Miller
Attys

Patented June 10, 1924.

1,497,257

UNITED STATES PATENT OFFICE.

JOHN O. ARKLEY, OF GARDEN GROVE, CALIFORNIA.

DRAWBAR HARROW LIFT.

Application filed June 7, 1923. Serial No. 643,930.

*To all whom it may concern:*

Be it known that I, JOHN O. ARKLEY, a citizen of the United States, residing at Garden Grove, in the county of Orange and State of California, have invented new and useful Improvements in Drawbar Harrow Lifts, of which the following is a specification.

This invention relates to lift apparatus for gang harrow agricultural implements, and it is an object of the present invention to provide a simple means whereby any one of a number of harrows may be independently lifted to clear the ground during operations. An object is to provide a simple and practicable form of harrow lift for gang harrows.

Other objects and advantages will be made manifest in the following specification of embodiments of the invention illustrated in the accompanying drawings, wherein—

Figure 1 is an end elevation and section showing the invention as applied to a gang harrow.

Fig. 2 is a plan showing one-half of a gang harrow with which the invention is combined.

Figure 3:
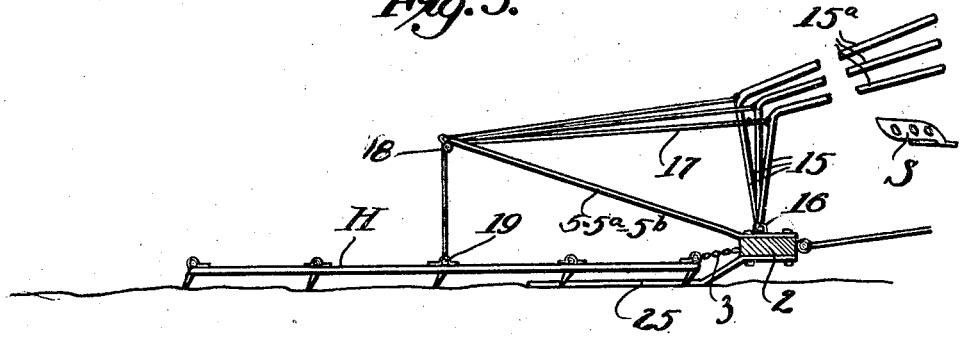
Fig. 3 is an end elevation and section of a modified form of the invention.

A form of my invention is shown in Figures 1 and 2, in which 2 indicates a portion of the draw beam of a gang harrow to which are hitched, as by chains 3, a number of harrows H, of any suitable form. It is an object of the invention to provide means for lifting each of the harrows independently of the others to clear the harrow of brush.

Secured to the beam or draft bar 2 is a series of upwardly and rearwardly extending bracket arms designated respectively by 5', 5 and 5'', the rear ends of each of which are provided with bearings 6. The harrows H are arranged in a transversely extending row behind the beam 2, and means are provided, under the control of the driver of a hauling vehicle and on the seat S, for lifting each harrow. Such means include a lever arm 7, one for each harrow, and these lever arms are each connected to one of a series of concentric rock-shafts, the outermost of which is indicated at 9. The rock-shaft 9 is journaled in the bearing 6 of the bracket arms 5 and 5' respectively. This rock-shaft 9 is provided with a rearwardly extending arm $9^a$, and this is connected by a link 10 to the mediate portion of the adjacent harrow H.

Through the rock-shaft 9 extends a rock-shaft 11, to which is secured an operating lever $11^a$, extending to the operator's seat S, and on the opposite end of each rock-shaft 11 is a lever arm $11^b$, connected by a downwardly extending link 10 to the subjacent harrow; the rock-shaft 11 being turnably supported in the short rock-shaft 9.

Extending through the hollow rock-shaft 11 is a rock-shaft 12, which is partly supported in the bearings 6 of arm 5. The rock-shaft 12 has a forwardly extending operating lever $12^a$ reachable by the operator on the seat S. The opposite or outer end of the rock-shaft 12 is provided with a rearwardly extending lever arm $12^b$, and this is connected by a downwardly extending link 10 to the outermost harrow H. It is understood that in Figure 2 one-half of a gang of harrows attached to the draw beam 2 is shown, and the operating system is duplicate for each half of the system.

Figure 4:
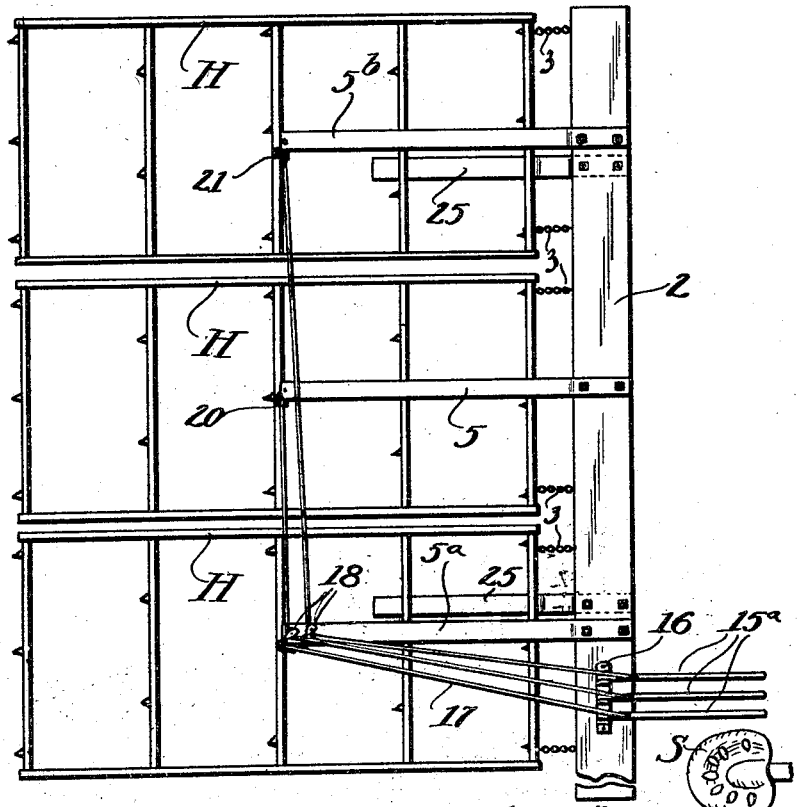
Fig. 4 is a plan of a portion of the gang harrow showing the device of Figure 3.

A form of the invention is shown in Figures 3 and 4 in which a gang of harrows H, one-half of which is shown, is attached to the draw beam 2, and this is provided with a series of upwardly and rearwardly extending brackets designated by 5, $5^a$ and $5^b$ one for each harrow H. The means for lifting each harrow independently include a bell crank lever having an arm 15, pivoted at its lower end at 16 on the beam 2, and having a forwardly extending handle portion $15^a$ contiguous to the seat S of the tractor, or other part upon which the seat may be provided. There is an operating lever 15 for each harrow, and each lever is connected by a flexible means, such as a cable 17, extending rearwardly, and each engaging a respective guide pulley 18, which is mounted upon the upper, rear end of the inner bracket $5^a$.

From this bracket $5^a$ one cable 17 extends down and is connected at 19 to the subjacent harrow. Another cable 18 extends outwardly to a guide pulley 20, over which it runs down and is attached to the next harrow, and a third cable extends outwardly to the outermost harrow passing over a guide pulley 21 on the outer bracket $5^b$.

From the above it will be seen that I have provided an extremely simple and practical means whereby the operator of a gang harrow can, at will, lift any one of the gang of harrows to clear the same from weeds and rubbish, without disturbing the others and without interrupting the advance of the implement.

Preferably, there are secured to the draft beam 2, rearwardly extending shoes 25 which serve to support the draft beam in an elevated, non-tiltable position.

It is understood that the device is equally as useful for single harrows as it is for gang harrows.

Further embodiments, modifications and variations may be resorted to within the principle of the invention.

What is claimed is:

1. In combination, in a gang harrow implement having a draw beam extending transversely of the implement, means, including handle parts extended to the operator's seat and mounted on said beam and being attached to the individual harrows, whereby any harrow may be lifted independently of the others.

2. In combination with a gang harrow having a transverse draft beam, a series of manually operable levers attached to said beam and extending to the implement operator's seat, and a connection between each lever and each harrow, whereby the harrows can be independently elevated.

3. In combination with a gang harrow having a transverse draft beam, a plurality of brackets mounted on the beam and extending rearwardly over and above the harrows attached to the beam, a series of manually operable levers mounted on said brackets and extending to the implement operator's seat, and a connection between each lever and each harrow, whereby the harrows can be independently elevated.

4. In combination, in a gang harrow implement having a draw beam extending transversely of the implement, means, including handle parts extended to the operator's seat and mounted on said beam and being attached to the individual harrows, whereby any harrow may be lifted independently of the others, the draw beam being provided with rearwardly extending traction shoes by which it is firmly supported.

In testimony whereof I have signed my name to this specification.

JOHN O. ARKLEY.